April 3, 1956  E. A. NEWMAN ET AL  2,740,906
THERMIONIC VALVE FEEDING CIRCUIT FOR PIEZOELECTRIC TRANSDUCER
Filed March 1, 1951  2 Sheets-Sheet 1

Edward Arthur Newman
David Oswald Clayden
Inventors

By Stevens, Davis, Miller & Mosher
their Attorneys

United States Patent Office 2,740,906
Patented Apr. 3, 1956

2,740,906

THERMIONIC VALVE FEEDING CIRCUIT FOR PIEZOELECTRIC TRANSDUCER

Edward Arthur Newman, Teddington, and David Oswald Clayden, Hanwell, London, England, assignors to National Research Development Corporation, London, England, a corporation of Great Britain Application March 1, 1951, Serial No. 213,410

Claims priority, application Great Britain March 23, 1950

1 Claim. (Cl. 310—8.1)

The invention relates to thermionic valve circuits for feeding pulse modulated signals into high Q parallel resonant electric circuits.

Such a resonant circuit will slow down any changes in the amplitude of a signal applied to it and, in particular, if the incoming signal is in the form of a train of rectangular pulses it will destroy the abruptness of the leading and trailing edges of the pulses with the result that the character of the pulses may be sufficiently masked to evoke an incorrect response from circuits fed from the resonant circuit.

The invention is particularly concerned with providing an input circuit for feeding trains of rectangular pulses into acoustic delay lines. An acoustic delay line consists essentially of a straight cylindrical tube filled with a fluid such as mercury and fitted at one end with a piezo- electric transducer (generally some kind of crystal which presents a capacitative input impedance) which transforms applied electrical energy into sonic energy for transmission through the fluid to a similar piezo-electric transducer at the other end of the tube which converts the sonic energy back into electrical energy.

Acoustic delay lines are used in electronic binary-digital computing machines for storing trains of electrical pulse signals representing binary numbers in which the presence of pulse in a given position in the train indicates a "1" and the absence of a pulse indicates a "0." A train of such signals would be fed into a delay having a delay time (the time taken for the sonic wave to travel the length of the tube) as great or greater than the duration of the train of signals and would be preserved indefinitely by feeding the output of the line back into the input. During each passage through the delay line the shape and amplitude of the pulse would deteriorate so that it is necessary to provide reshaping and amplifying circuits in the circulating path of the pulse signals in order to preserve the identity of the signal.

The length of the delay line and hence the number of pulse signals it can preserve will be limited by the requirement that the nature of the output from the line must be invariably capable of correct interpretation. As the clarity of the pulse train emerging from the delay line will be improved if the shape of the pulses actually entering the line is rendered more closely rectangular it is apparent that compensation of the capacitative impedance of the piezo-electric crystal feeding an acoustic delay line will enable the length and/or reliability of such lines to be increased.

In practice, in order to enable the piezo-electric crystal to efficiently transform the electrical energy fed to it into sonic energy, the incoming electrical signal is modulated on a carrier frequency near to the natural frequency of vibration of the crystal. It is thus possible to provide an inductance in parallel with the effective capacitance of the crystal so that a parallel resonant circuit is formed, resonant at and therefore an acceptor of signals modulated on this carrier frequency.

The resonant circuit so formed will have small losses and so a high Q value and so applied electrical oscillations will require a certain time to build up to, or diminish to, a new and different magnitude. As the duration of a unit pulse signal representing a binary digit "1" or "0" in electronic binary-digital computing machine employing acoustic delay lines is of the order of one microsecond, it will be appreciated that unless this build up time is made appreciably less than one microsecond in this case, the shape of each unit pulse signal will be greatly distorted.

It is therefore an object of the invention to provide for feeding rectangular pulse modulated signals into a low loss parallel resonant circuit, an electrical circuit arrangement which partially or almost completely compensates for the loss of shape of the pulses which would otherwise occur.

According to the present invention an input circuit for feeding rectangular pulse modulated signals into a high Q parallel resonant circuit, comprises a thermionic valve having a cathode, an anode, and a control grid to which the signals are arranged to be applied, and a transformer forming part of said resonant circuit and having a primary winding forming part of the anode circuit of the valve and having a secondary winding, the whole or a portion of which is connected into the cathode circuit of the valve in such a sense that the current flowing through the valve due to this connection would oppose the current flowing through the valve due to the signal applied to its control grid.

The invention will now be described with reference to the accompanying drawings in which:

Figures 2 and 3 show input circuits to an acoustic delay line according to the invention, while

Figure 1:
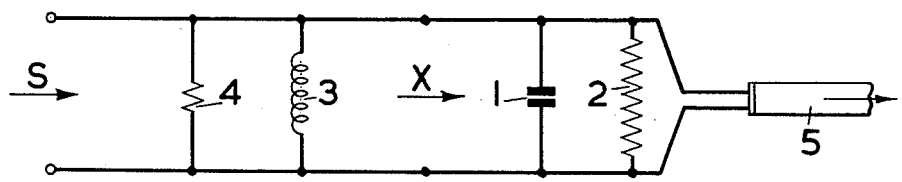
Figure 1 shows a typical input circuit to an acoustic delay line.

As shown in Figure 1 the input impedance appearing at X of a mercury delay line 5 to which the signals are applied by means of a piezo-electric crystal is a capacitance 1 in parallel with a resistance 2. Typical values of these components are 20 micro-micro-farads and 100 kilohms. As previously mentioned the incoming signal preferably has a frequency near to the natural frequency of vibration of the crystal and an inductance coil 3 is inserted across the input terminals of the delay line which produces an inductive reactance equal to the capacitative reactance of the capacitance 1 at the carrier frequency thus forming a high Q parallel resonant circuit. With the typical capacity value already given the inductance 3 would be required to have a value of about 5 microhenries for a carrier frequency of 15 mc./sec. so that the value of Q in this case would be greater than 200.

Figure 4:
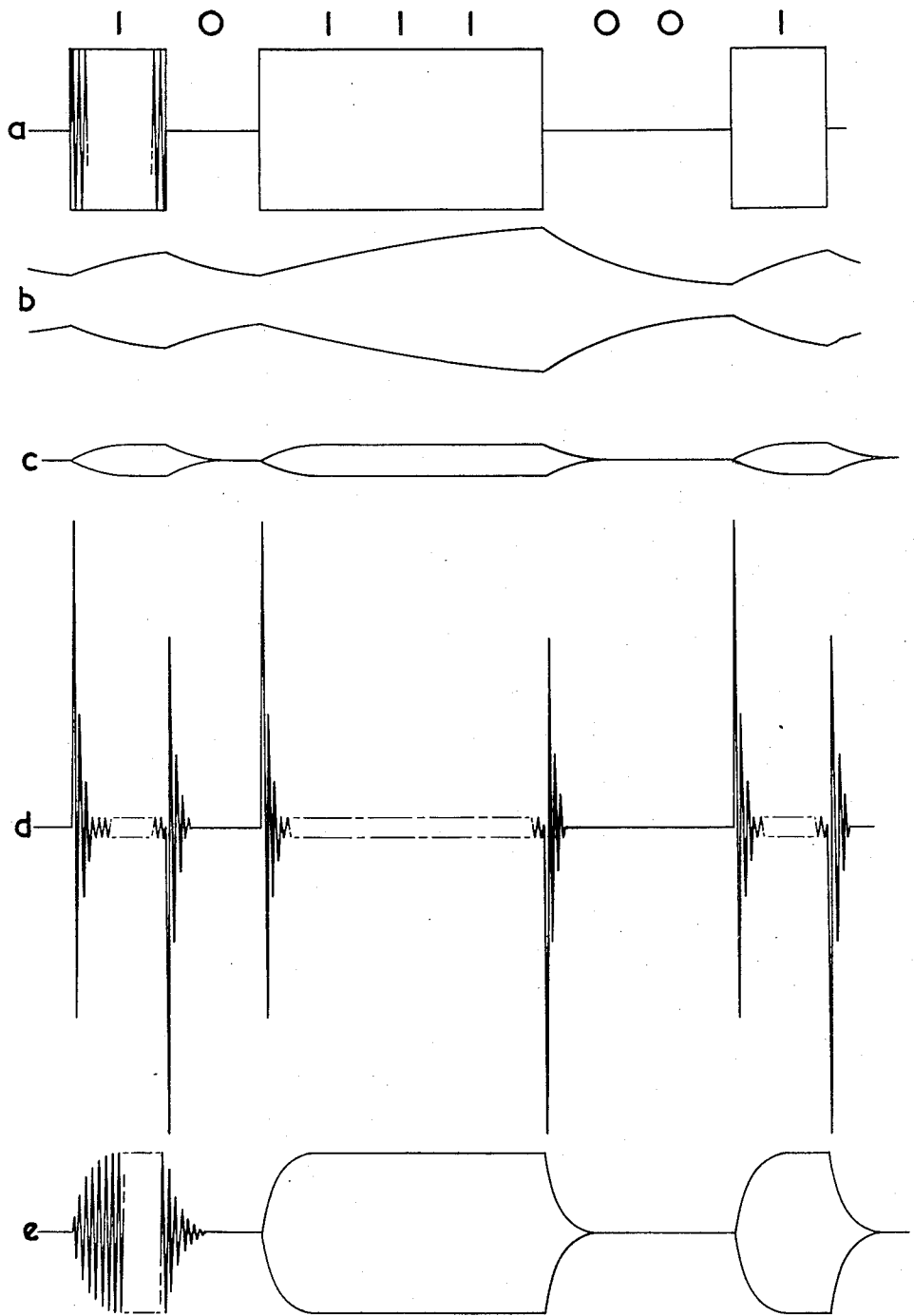
Figure 4 shows waveforms occurring in the circuits shown in Figures 1 and 2.

If such a circuit is fed with a succession of pulses 1 micro-second or integral multiples of 1 micro-second long modulated at 15 mc./sec. as shown in Figure 4(a) which shows a succession of pulses representing a binary number . . . 101110010, the peak value of the 15 mc./sec. oscillation will vary in the manner shown in Figure 4(b). The logarithmic decrement of the ringing circuit which constitutes the input impedance to the mercury delay line is exp. ($\pi/Q$) or about exp. (1/60) where Q is about 200, so the time taken for the potential to reach say 90% of its maximum value is about 2.3×60 cycles or 150 cycles. In practice, due to losses in the inductance coil, the maximum value is reached sooner but is still considerably in excess of 15 cycles which is the duration of a unit one microsecond pulse signal. The time taken for the potential to decline after a pulse during a blank pulse period is of course similarly slow so that it is apparent that such a signal as shown in Figure 4(b) could not be passed down an acoustic delay line of any considerable length without being rendered unintelligible before reaching the other end.

It should be noted, for example, that the mean amplitude of the second "0" in the input signal immediately following the three consecutive "1's," is greater than the mean amplitude of the first of the three consecutive "1's."

A method commonly used to decrease the time constant of the input circuit is to shunt a resistance across the low loss resonant circuit as shown in Figure 1 so that the losses of the circuit are increased. If the value of this resistance 4 is made a small fraction of the value of the input resistance 2, the Q of the resonant circuit and the time constant is reduced by a substantially equal fraction. However, approximately only this small fraction of the input energy can pass down the line as the rest is dissipated in the resistance 4. Figure 4(c) shows the form of the peak values of the carrier frequency wave which would pass down the line if the resistance 4 was about 1/6 of the value of the input resistance 2. In practice the relative value of the resistance 4 would have to be appreciably less than this, for example about 1 kilohm so that a negligible amount of distortion of the shape of the rectangular pulses would occur. In this case only about 1/100 of the generated energy would be able to pass down the delay line and with such an arrangement it has been found difficult in practice to pass the desired amount of energy into the delay line.

The method, according to the invention, of obtaining a potential waveform in the delay line which is substantially the same as that applied to the input circuit of the line without involving this great loss of energy and so enabling a greater amount of energy to be passed into the delay line will now be explained with reference to Figures 4(d) and 4(e). The initial rate of rise of the potential applied to the delay line will depend upon the input circuit constants and upon the initial magnitude of the applied pulse signal. Thus, if each pulse could be made to give an initial drive on the resonant circuit which was many times as great as the drive on this circuit during the remaining part of the pulse as shown in Figure 4(d) the initial rate of rise of the pulse sent down the delay line would be an equivalent number of times that of the initial rate of rise of pulses as shown in Figure 4(b). Similar considerations apply to the trailing edges of pulses so that the trailing edges of the input pulses will be considerably sharpened if they could be made to give rise to a large final drive on the resonant circuit in antiphase to the steady oscillation set up for the duration of the pulse period. If this anti-phase drive was the same magnitude as the initial drive, it would be sufficient to just kill the steady oscillation.

Figure 2:
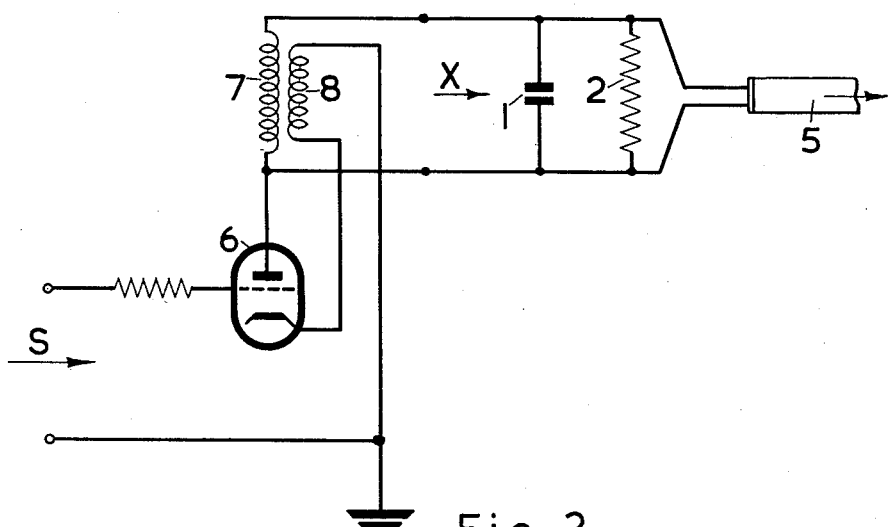

A simple circuit for adding these initial and final drives to the resonant circuit will now be described with reference to Figure 2. A train of rectangular pulses modulated on a carrier frequency of 15 mc./sec. in the manner shown in Figure 4(a) is applied at S to the grid of the triode valve 6. The anode circuit of the valve 6 comprises the primary winding 7 of a very closely coupled step-down transformer, the winding being connected to the input X of the delay line 5 in a manner similar to the connection of the inductance coil 3 across the input X to the delay line 5 as shown in Figure 1, so that a tank circuit resonant at 15 mc./sec. is formed.

The secondary winding 8 of the step-down transformer is connected into the cathode circuit of the valve 6 so that the output of the anode circuit appearing across the primary winding 7 is fed back into the cathode circuit in such a sense that the flow of valve current due to the signal applied to the control grid is opposed. The amount of this feedback will be determined and can be controlled by the turns ratio of the step-down transformer.

Before the application of a pulse signal at S there is no oscillation in the anode resonant circuit and therefore no signal fed back to the cathode. The leading edge of each pulse signal as shown in Figure 4(a) when applied to the grid of valve 6 causes an initial high magnitude oscillating current to flow through the primary winding 7 of the transformer. The resonant tank circuit is thus initially driven by a current which if maintained would produce an output into the delay line many times in excess of the output required. The output into the delay line 5 therefore initially builds up as shown in Figure 4(e) at a rate which is a corresponding number of times as rapid as if it were driven by a current which would merely maintain the required output as shown in Figure 4(b). However, this oscillation built up in the resonant circuit causes current to flow in the secondary winding 8 of the step-down transformer connected in series with the valve 6. This current flows through the valve 6 in opposition to the driving current thereby reducing it. Thus as the output from the resonant circuit builds up the driving current is rapidly reduced to a relatively low value just sufficient to maintain the output at this rapidly attained value. Figure 4(d) which shows typical driving current waveforms produced when the train of pulse signals shown in Figure 4(a) is applied to the grid of valve 6, clearly shows the manner in which the initial high magnitude driving current oscillation is rapidly reduced due to the opposing feedback current so that the resulting output into the delay line 5 equally rapidly assumes a constant value as shown in Figure 4(e). From Figure 4(e) it can be seen that the output is built up by the initial driving current far more rapidly than the output is built up by a directly fed low loss resonant circuit as shown in Figure 4(b) or by a directly fed resonant circuit in which the losses have been increased as shown in Figure 4(c). It will be appreciated that just as Figure 4(c) was drawn for the sake of ease of illustration as showing the modification to the output waveform shown in Figure 4(b) when the losses in the resonant circuit were increased 6 times whereas in practice they would be increased about 100 times. Figures 4(d) and 4(e) are drawn assuming that the amplification of the valve 6 is about 15 and the proportion of the output fed back to the cathode circuit is about 1/4. In practice, if the amplification factor of the valve and the proportion of the output fed back are both increased a more rectangular shaped output of similar magnitude can be obtained.

Figure 3:
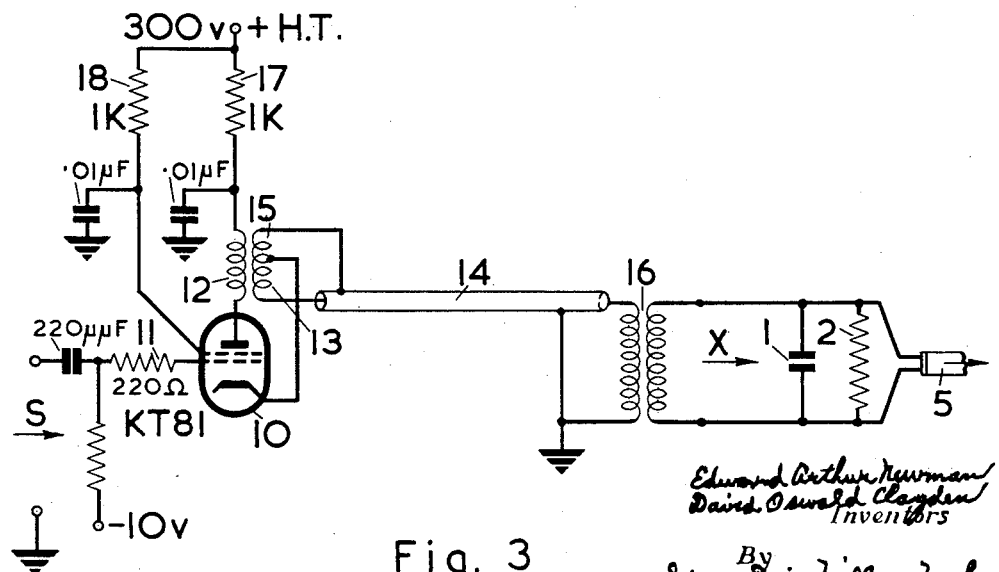

Figure 3 shows a practical circuit arrangement according to the invention for feeding an acoustic delay line 5 through a length of low impedance coaxial line 14, matched to the delay line by the transformer 16. (An auto-transformer may be used in place of the transformer 16.) The effective capacitance 1 of the crystal therefore forms a parallel resonant circuit with the secondary winding 13 of the transformer in the anode circuit of the output valve 10. The valve 10 is a tetrode KT81 and is fed at S through a 220 ohm parasitic stopping resistance 11 with pulse modulated signals having a waveform shown in Figure 4(a). The grid is biassed to −10 volts just beyond cut off so that the valve 10 operates as a class C amplifier and only the positive going oscillations produce a flow of current in the valve 10. The anode of the valve 10 is connected to a +300 v. H. T. supply through the primary winding 12 of the transformer and a 1 kilohm resistance 17. The screen grid of valve 10 is also connected to the H. T. supply through a 1 kilohm resistance 18.

The initial positive going excursion of a pulse signal therefore produces a large valve current which flowing through the primary winding 12 of the transformer drives the secondary winding 13 and the piezo-electric crystal of the acoustic delay line 5. The cathode of the valve 10 is connected to a tap 15 on the secondary winding 13 so that a portion of the output current is fed back through the valve 10 in opposition to the input driving current due to the input signal applied at S to the valve grid. The next pulse of driving current is therefore less than the first one by an amount depending upon the tap position 15. This tap position is adjusted so that the feedback is sufficiently great to reduce the third or fourth pulse of driving current to a value which is just enough to maintain and no further increase the output level. Then as the unit pulse signals representing a binary digit are 1 microsecond long modulated onto a carrier frequency of 15 mc./sec. the full value of the pulse signal is maintained for at least 12 cycles out of a possible 15 cycles.

When the drive on the grid is terminated at the end of a pulse signal the output still sustained in the resonant circuit comprising the secondary winding 13 and the crystal capacitance 1 still maintains the drive on the cathode which causes a pulse of current to flow in the primary winding 12 which is in antiphase to the previous driving pulses. This pulse of current will therefore drastically reduce the output and the next few pulses of current will rapidly kill this oscillation altogether.

What we claim is:

An input circuit for feeding rectangular pulse modulated high frequency signals into an acoustic delay line fitted with a piezo-electric transducer which presents a capacitative impedance to the input circuit, and comprising a thermionic valve having a cathode, an anode, and a control grid to which the signals are arranged to be supplied, a very closely coupled step-down transformer having a primary winding forming part of the anode circuit of the valve and a secondary winding, one of said transformer windings being coupled to said piezo-electric transducer to form a circuit resonant at the natural frequency of oscillation of said transducer, and at least part of said secondary winding being connected into the cathode circuit of the valve in such a sense that the current flowing through the valve due to this connection would oppose the current flowing through the valve due to the signal applied to its control grid and means for biasing the said valve so that said valve operates near the cut-off point.

References Cited in the file of this patent

UNITED STATES PATENTS

| | | |
|---|---|---|
| 2,351,934 | De Kramolin | June 20, 1944 |
| 2,512,130 | Arenberg | June 20, 1950 |
| 2,659,776 | Nowak | Nov. 17, 1953 |

FOREIGN PATENTS

| | | |
|---|---|---|
| 541,260 | Great Britain | Nov. 19, 1941 |